(No Model.) 2 Sheets—Sheet 1.

W. G. DAVIS.
VEHICLE SHAFT.

No. 605,632. Patented June 14, 1898.

Witnesses:
A. C. Harmon
Edward F. Allen

Inventor:
Wilbur G. Davis.
by Crosby Gregory attys.

(No Model.) 2 Sheets—Sheet 2.
W. G. DAVIS.
VEHICLE SHAFT.
No. 605,632. Patented June 14, 1898.
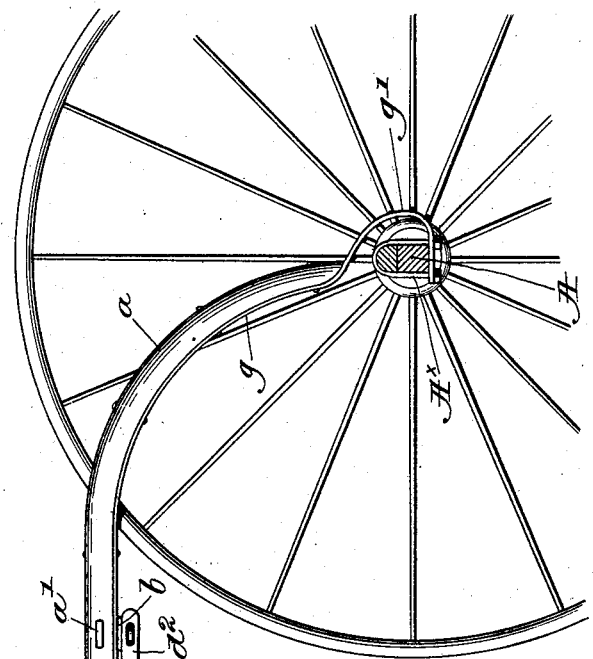
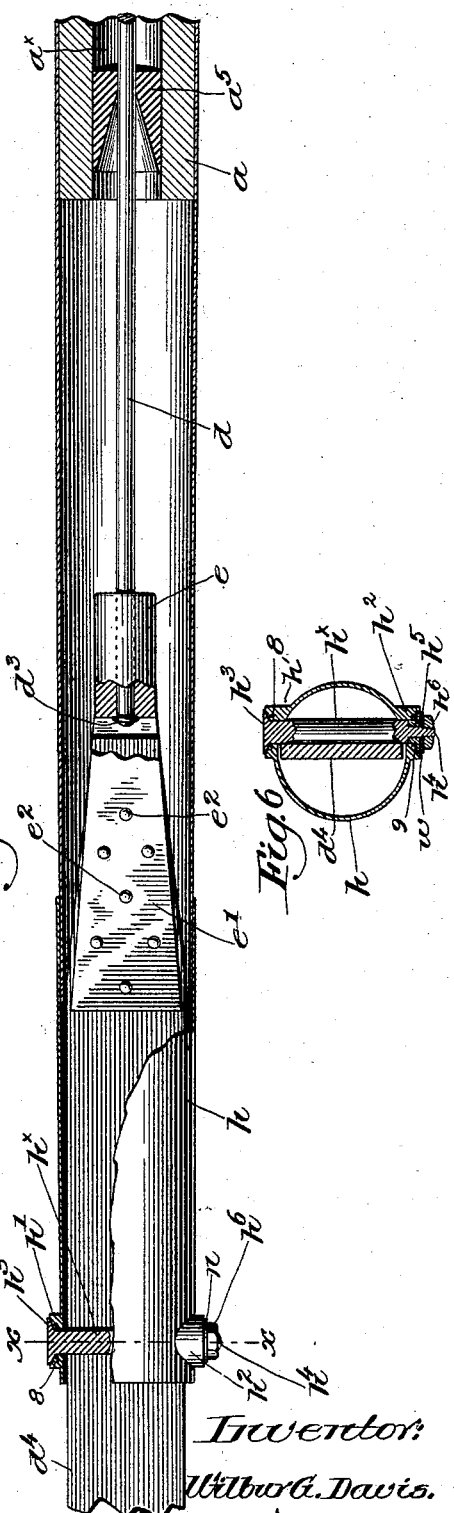
Witnesses:
R. C. Harmon
Edward F. Allen
Inventor:
Wilbur G. Davis.
by Crosby Gregory
attys.
THE NORRIS PETERS CO., PHOTO-LITHO., WASHINGTON, D. C.

UNITED STATES PATENT OFFICE.

WILBUR G. DAVIS, OF CONCORD, MASSACHUSETTS.

VEHICLE-SHAFT.

SPECIFICATION forming part of Letters Patent No. 605,632, dated June 14, 1898.

Application filed November 6, 1897. Serial No. 657,613. (No model.)

*To all whom it may concern:*

Be it known that I, WILBUR G. DAVIS, of Concord, county of Middlesex, State of Massachusetts, have invented an Improvement in Vehicle-Shafts, of which the following description, in connection with the accompanying drawings, is a specification, like letters and figures on the drawings representing like parts.

This invention has for its object the production of novel vehicle-shafts whereby the mode of attachment to the horse is improved and simplified, the appearance of the team greatly enhanced, and the freedom of movement of the horse increased without any decrease in safety.

In conducting my experiments I have aimed to constantly combine utility and safety with graceful simplicity and elegance of construction.

Horsemen are well aware that the long traces in common use are not only expensive, but they are a constant source of annoyance, owing to the flapping between the shafts and the sides of the animal, and usually each set of harness has its own pair of traces. So, too, in harnessing a spirited or restive animal two men are necessary, one to raise the shafts while the other backs the animal into position, after which the shafts are run through loop-like lugs on the saddle-band and the hitching up is then completed. By my present invention I am enabled to greatly simplify the harness required, to obviate entirely the annoying flapping of traces due to horse motion, and by using a pair of draft members permanently attached to the shafts or whiffletree I avoid the use of a separate pair of expensive traces for each harness. So, too, by my invention I eliminate trace-loops on the shafts and guard-loops for the whiffletree and so attach the shafts to the vehicle-axle that they are normally upheld in position to receive the horse when hitching up.

Figure 1:
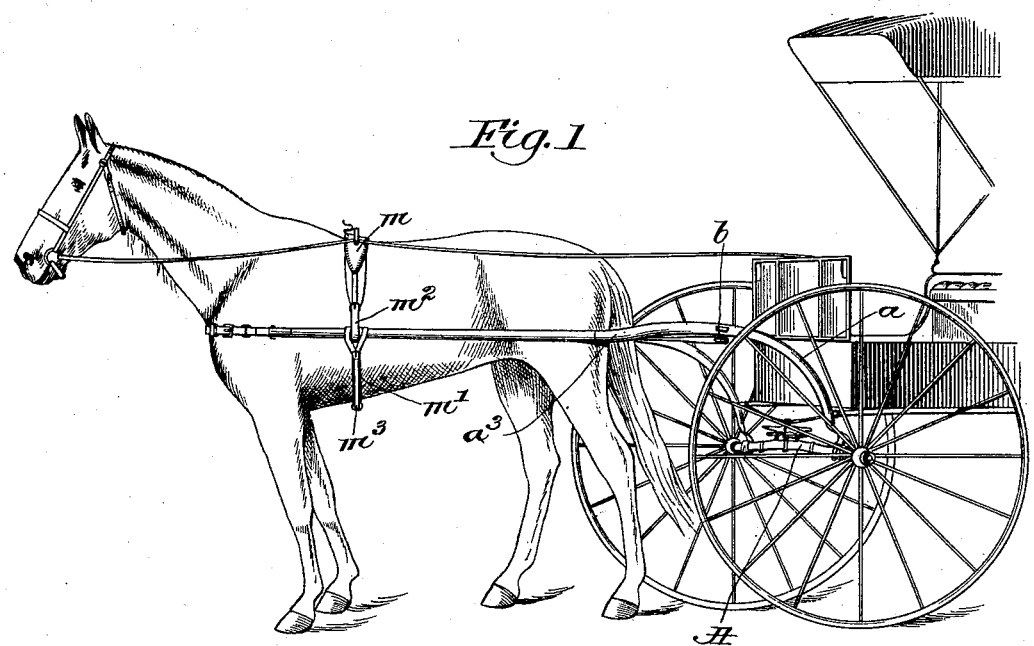
Figure 2:
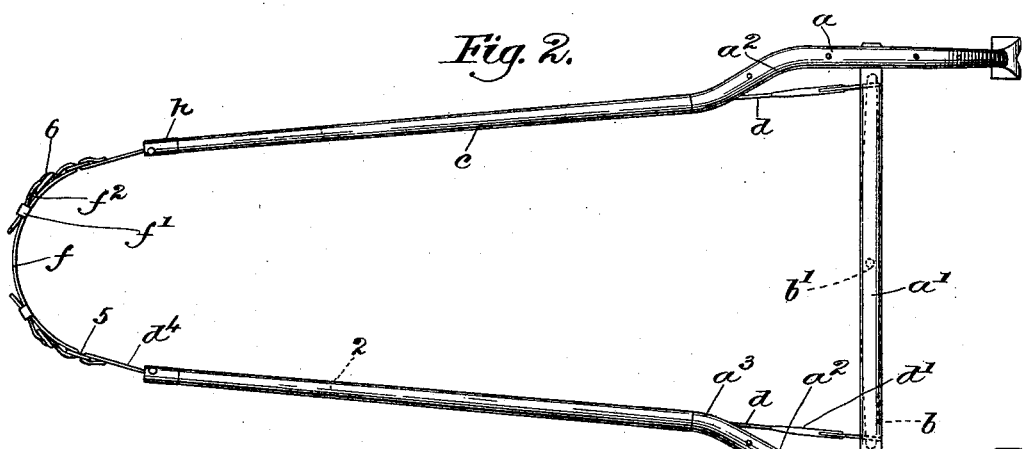
Figure 7:
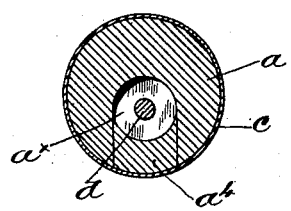
Figure 3:
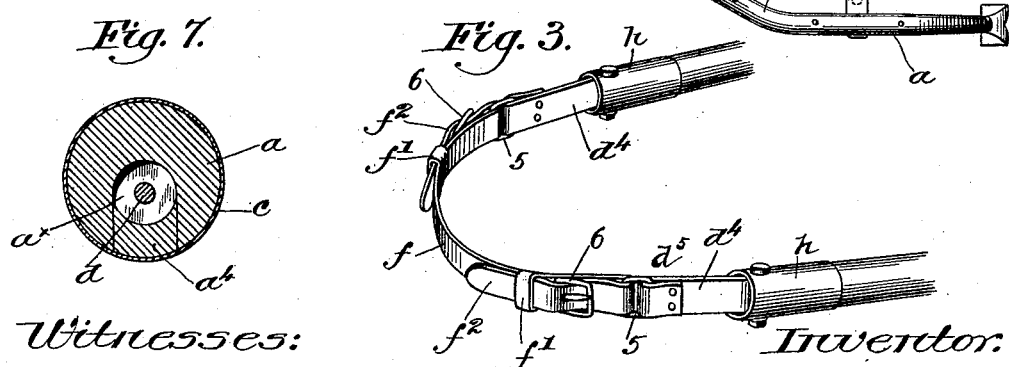

Figure 1 is a perspective view of the front end of a vehicle having my invention applied thereto, the horse being shown harnessed to better illustrate various features of my invention. Fig. 2 is a top or plan view, enlarged, of the shafts, draft members, and breast-strap attached thereto. Fig. 3 is a larger detail view in perspective of the front ends of the shafts with the breast-strap attached to the draft members. Fig. 4 is a side elevation, partially in longitudinal section, of one of the shafts, showing its mode of attachment to the axle and the draft member extended within the shaft for the greater portion of its length. Fig. 5 is an enlarged longitudinal sectional view of the front end of the shaft. Fig. 6 is a transverse section thereof on the line $x\ x$, Fig. 5, showing the bearing at the shaft-tip for the draft member; and Fig. 7 is an enlarged transverse sectional view of the shaft on the line $x'\ x'$, Fig. 4.

Referring now to Figs. 1 and 2, the shafts $a$, bent upwardly from the point of attachment to the axle A of the vehicle, are separated and rigidly connected by the usual cross-bar $a'$, upon which I have herein shown a whiffletree $b$, swiveled at $b'$ beneath the cross-bar, such location being preferred as bringing the point of application of the draft members as low as possible and also because the appearance of the device is improved. In front of the cross-bar the shafts are bent inward at $a^2$ and downward at $a^3$, from which point the shafts continue straight to the tips and converging toward their outer ends, as clearly shown in Fig. 2. The inward bends $a^2$ are for the purpose of decreasing the distance between the shafts to bring them close to the sides of the horse, while the downward bends $a^3$ bring the straight portions of the shafts into the plane of the whiffletree.

I prefer to make the shafts of hickory or any other tough, strong, and elastic material, the wooden body of the shaft extending forward to about the point 2, Fig. 2, and having applied to it in any suitable manner a tightly-fitting thin metallic tube $c$, which may extend rearwardly to a point near the bend $a^3$. Before the tubular envelop $c$ is applied the shaft is provided with a longitudinal bore $a^\times$, Figs. 4, 5, and 7, terminating at 3 in alinement with the end of the whiffletree, and herein I have shown the bore as made by routing the under side of the shaft and then closing the trough or channel with a tightly-fitting strip $a^3$, suitably secured in place.

The bore may be made only slightly greater in diameter than the draft member $d$, preferably a stout wire rod, or I may insert a series of separated bearings $a^5$ in the bore, Figs. 4 and 5, through which the draft member moves easily, said bearings being made of leather, rawhide, or other suitable material, preventing any noise or rattling of the draft member.

At its rear end each draft member is enlarged, as at $d'$, and has attached thereto a leather $d^2$, having a suitable slot or eye to fit over the usual arrow-head on the whiffletree or other point of attachment, and it will be seen from Fig. 4 that a very small portion of the draft member is exposed between the shaft and whiffletree. The other end of the draft member $d$ extends some distance beyond the wooden body portion $a$ of the shaft and enters the solid end $e$ of a metal fitting, the flattened end $e'$ of which is bifurcated to permit the end of the draft member to be upset, as at $d^3$, Fig. 5. One end of a broad leather strap $d^4$ is then inserted between the ends $e'$ of the fitting and held in place by rivets $e^2$, and this strap and the fitting are inclosed or protected by the tubular sheath or envelop $c$, shrunk or forced onto the shaft. The outer end of the strap is turned over to form a loop $d^5$, which holds a ring 5, and the breast-strap $f$ has attached to the outer side near each end a buckle 6 and a loop $f'$, the ends $f^2$ of the strap being passed through the rings 5 and then through the buckles 6 and loops $f'$, as clearly shown in Fig. 3.

Inasmuch as the extreme ends or tips of the shafts are close to the horse and at the points where a breast-strap is usually supported by a neck-strap I am enabled to dispense with the latter, the shafts and the straps $d^4$ serving to effectually retain the breast-strap in place on the horse. Owing to the curvature of the shoulders of the horse the straps $d^4$ will be bent inward after emerging from the open ends of the shafts, and to reduce wear and lessen friction I have mounted a ball-bearing in the front end of the shaft either directly on the sheath $c$ or, preferably, as herein shown, on a removable tip or cap $h$.

Referring to Figs. 5 and 6, I have shown an upright roller $h^\times$, extended through bosses $h'$ $h^2$ on the cap, recessed to form raceways for antifriction-balls 8 9, one end of the roller being flared at $h^3$ to rest on the series of balls 8. At its other end the roller is reduced and threaded at $h^4$ to receive a flanged nut $h^5$, Fig. 6, which bears upon the balls 9, a washer $w$ and check-nut $h^6$ retaining the flanged nut in place. The roller $h^\times$ thus rotates freely on ball-bearings and is located at one side of the longitudinal center of the shaft, so that the strap $d^4$, attached to the draft member $d$, will emerge centrally from the shaft and will bend over or around the roller $h^\times$ with a minimum of wear.

A strip of spring metal $g$ is bolted to the rear end of each shaft and is bent at $g'$, Fig. 4, to pass around the back of and beneath the axle A, to which it is secured by suitable clips $A^\times$, the spring-couplings not only serving to maintain the shafts normally elevated, but also obviating the use of any antirattling device.

As shown in Fig. 1, the usual harness-saddle $m$ is retained in place on the horse's back by a belly-band $m'$, and lugs $m^2$ depend from the saddle to receive the shafts, said lugs being closed by buckles or in other suitable manner. I have dispensed with a breeching, the function of the usual breeching being performed by a suitable strap $m^3$, attached to the belly-band and wrapped around the shaft adjacent the lug, permitting movement of the shaft longitudinally under ordinary circumstances, but tightening when the horse pulls back, so that at such time the strain comes on the back of the horse at the saddle. I am thus enabled to reduce the harness to a very few parts so located that the freedom of movement of the horse is not curtailed in the least.

The pull is transmitted by the draft members in straight lines directly from the breast and shoulders of the horse to the whiffletree or the points of attachment, said draft members being concealed for the greater part of their length within the shafts, and rattling or flapping is absolutely prevented. Should the whiffletree break, the draft member will be retained in the shaft, so that the horse is not freed.

The shaft-couplings take the weight of the shafts from the horse, so that his whole strength and energy may be exerted in pulling the vehicle, with the greatest freedom of movement and with little horse motion imparted to the vehicle.

In changing from one harness to another it is only necessary to unhitch the straps $d^4$ and apply them to another harness, the draft members being permanent with the shafts.

My invention is not restricted to the precise construction and arrangement shown, as the same may be variously modified or rearranged without departing from the spirit and scope of my invention.

Having fully described my invention, what I claim as new, and desire to secure by Letters Patent, is—

1. Vehicle-shafts having longitudinal bores through their straight portions, draft members concealed therein, and a whiffletree to which the rear exposed ends of said draft members are attached.

2. The combination with vehicle-shafts having a cross-bar, and a whiffletree mounted thereon, of draft members attached to the whiffletree and extended through the shafts.

3. Vehicle-shafts having an attached crossbar and bent inward and downward in front of said bar, attaching means mounted on the cross-bar in the plane of the straight outer portions of the shafts extended from the inward bends, and draft members connected with said attaching means and extended through longitudinal bores in the straight portions of the shafts.

4. Vehicle-shafts having longitudinal bores in their straight portions and open at their tips, draft members permanently retained in the shafts and extended through the open tips, and an antifriction-bearing located at or near the tip of each shaft, for the adjacent portion of the draft member.

5. Vehicle-shafts having an attached cross-bar, a whiffletree mounted thereon, said shafts being bent in front of the cross-bar to bring their straight portions into the plane of the whiffletree, and permanent draft members attached to the whiffletree and led through the straight portions of the shafts.

6. Vehicle-shafts comprising wooden body portions having straight, longitudinally-bored forward ends, draft members passed through the said straight portions of the shafts, and a metallic envelop or sheath for the straight portion of each shaft.

7. Vehicle-shafts, draft members extended therethrough and having laterally-flexible extensions at their front ends to be attached to the harness, antifriction-bearings for said extensions mounted on the shafts, and means to secure the rear ends of the draft members to the vehicle.

8. Vehicle-shafts downturned at their rear ends and rigidly connected by a cross-bar, said shafts being bent inward and downwardly between said bar and the straight front ends of the shafts, the shafts having longitudinal openings in their straight portions.

9. Vehicle-shafts having straight, longitudinally-bored portions, and draft members extended therethrough and exposed at their front and rear ends respectively.

In testimony whereof I have signed my name to this specification in the presence of two subscribing witnesses.

WILBUR G. DAVIS.

Witnesses:
JOHN C. EDWARDS,
AUGUSTA E. DEAN.